Jan. 13, 1953 — H. W. YERIAN — 2,625,372
TRAILER FOR HAULING FARM IMPLEMENTS
Filed Jan. 13, 1949
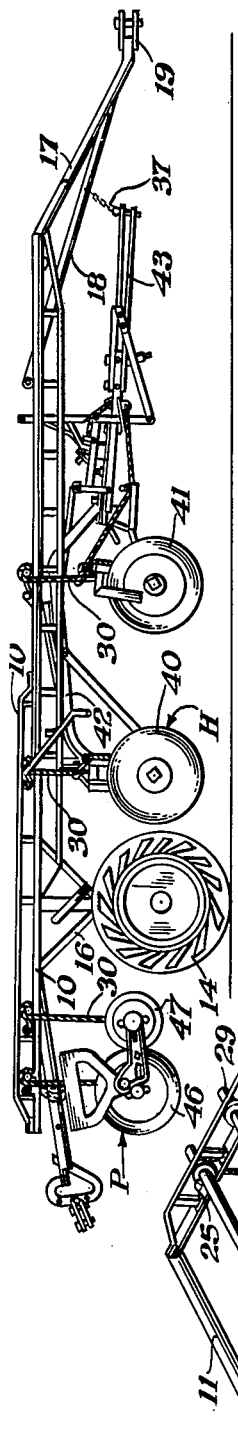
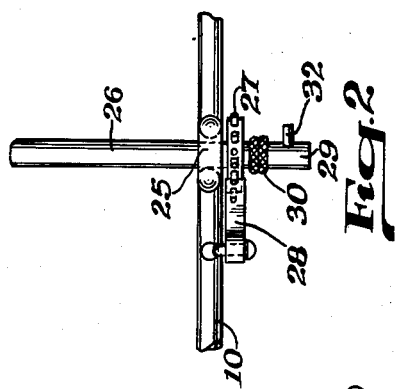
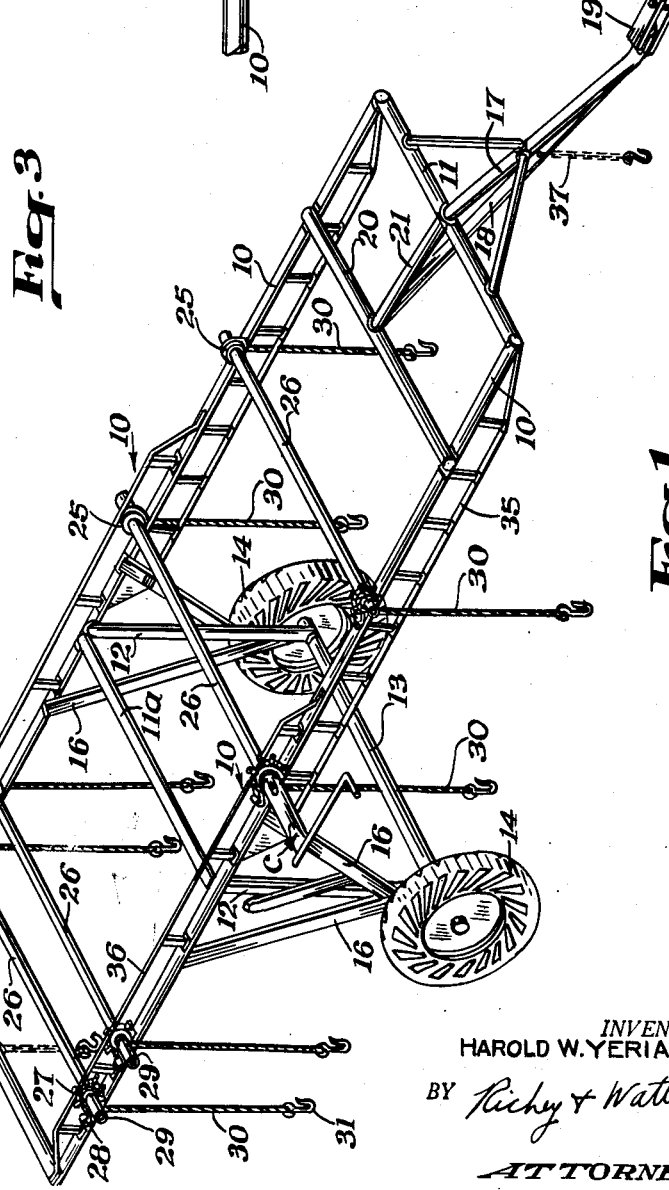
INVENTOR.
HAROLD W. YERIAN.
BY Richey & Watts
ATTORNEYS.

Patented Jan. 13, 1953

2,625,372

UNITED STATES PATENT OFFICE 2,625,372

TRAILER FOR HAULING FARM IMPLEMENTS

Harold W. Yerian, Cumberland, Ohio

Application January 13, 1949, Serial No. 70,726

6 Claims. (Cl. 254—139.1)

This invention relates to trailers for the transportation of heavy agricultural implements such as harrows, drags, rollers, soil packers, plows, and the like. This invention is specifically directed to a trailer of the class described which is capable of transporting two of such implements.

It is an object of the invention to mount and carry two heavy implements by means of a trailer having a framework well spaced above the ground from which the implements are suspended, there being struts extending downwardly from the framework attached to a cross axle upon which are mounted a pair of road wheels, this construction being of great structural strength.

It is a further object of the invention to facilitate mounting the equipment on an axle-braced trailer and to provide a balanced construction about the wheels. This is accomplished by mounting the wheels between the ends of the trailer framework. This provides forward and rearward zones for suspension of two pieces of equipment. Since the axle extends across the struts, the trailer cannot be backed over both implements prior to mounting them. However, by forming the framework adjacent the forward mounting zone so that its sides are substantially clear of downwardly-extending projections, the forward mounting zone may be readily positioned over a piece of equipment by moving the trailer forwardly and laterally thereover. The rearward piece of agricultural equipment may be readily mounted by forming the framework so that the rear end is devoid of downward obstructions whereupon the trailer may be backed over the equipment.

As a result of the invention a trailer of the class described is provided which is sturdily balanced, braced across the wheels, and which can readily be positioned so as to mount two heavy agricultural implements. The manner in which a preferred embodiment of the invention accomplishes these results will be apparent from the following detailed description thereof.

In the drawings:

Fig. 1 is a perspective view of the trailer in its unloaded condition;

Fig. 2 is a detail of one of the windlass assemblies; and,

Fig. 3 is a side elevation showing two pieces of equipment suspended from the framework of the trailer.

As seen in the drawings, the trailer chassis includes a generally rectangular framework structure supported well above the ground. This framework includes a pair of parallel side members 10 riveted to a pair of end pieces 11 to form the generally rectangular framework structure. In order to mount the road wheels, a pair of struts 12 are welded to the side pieces 10 adjacent a framework cross-brace 11a and extend downwardly to form wheel mounting members. A solid axle 13 is welded to the ends of struts 12 and serves to brace them laterally. Road wheels 14, preferably rubber-tired, are journalled on the free ends of axle 13. The wheel mounting assembly is braced longitudinally by members 16 welded to the strut members 12 and to the frame members 10.

In order to provide for attaching the trailer to a tractor unit, suitable tongue structure is provided which, in the form shown, comprises members 17 and 18 welded at one end to the frame structure and extended gradually forwardly and downwardly from the frame. A suitable yoke 19 is welded to the free end of the tongue for attachment to the drawbar of a tractor or similar vehicle. Lateral and horizontal brace members 20 and 21 add to the rigidity of the assembly.

In order to support one implement forwardly of the wheels and another rearwardly thereof, two pairs of windlass assemblies are provided. Each windlass assembly is mounted in bearings 25 welded to the longitudinal frame members 10 and comprises a tubular cross-piece 26 journalled in the bearings, a ratchet 27 welded to the cross-piece, and a pawl or dog 28 pivotally mounted on the frame structure adjacent the ratchet. The cross-piece 26 is extended past its bearings at each end as at 29 to act as a drum for suitable tension means such as cables 30. The cables may have the usual hooks 31 fastened to the free ends thereof. In order to provide for rotation of the windlass drums a crank C is provided which has a slotted tubular sleeve member that telescopes over the ends 29 of the windlasses and makes driving connection with a pin 32 on the windlass drum.

As seen in Fig. 3 a pair of agricultural implements are shown suspended from the trailer framework. Although the trailer can be used to support any heavy implement providing it is not too large, by way of illustration a disc harrow H and a roller or soil packer P are shown suspended from the trailer. For example, the harrow H may include two rows of discs 40 and 41 mounted on the framework 42, and a forwardly extending tongue 43. This unit is independently mounted forwardly of the wheels by means of a forward pair of windlass assemblies. The cables and hooks are fastened in any suitable manner to the harrow and the harrow is then raised from the ground by manipulating the windlass assemblies with the crank.

Similarly a heavy soil packer P is shown suspended rearwardly of the wheels. By way of example, such a device may include a pair of heavy rollers 46 and 47 to which the corresponding hooks and cables are made fast, whereupon the windlasses are operated to raise the rollers from the ground.

When the implements are suspended in the trailer they may be arranged so that the trailer is substantially balanced. In other words, the wheels are preferably rearward of the midsection of the trailer so that the heavier implement may be carried by the wheels in a position so that it counterbalances the forward implement which may be of lighter construction. This construction has the advantage that ample room forwardly of the wheels is provided for the combined forward and swinging motion needed to mount the forward implement. The implements are readily mounted on the trailer despite the fact that the axle 13 extends across the struts and acts as a brace, a construction that precludes driving forwardly or backing rearwardly over both implements.

Although it is immaterial which implement is mounted first, the mounting of each may be described as follows: Assume that the disc harrow is resting upon the ground. By means of the tractor device the trailer is moved forwardly toward the harrow and close to one side thereof. As the forward framework portion is pulled abreast of the harrow, the tractor is manipulated so that the trailer is swung laterally which brings its forward load supporting portion directly over the harrow. Since the forward framework is devoid of lateral members which extend any appreciable distance toward the ground, this operation is performed without interference. The cables are then attached and the harrow is then lifted by means of the windlasses as described. It is noted that due to the tongue construction of the trailer, the tongue of the harrow may be relatively long without interfering with the trailer tongue. A tension means such as a chain 37 may depend from the trailer tongue to steady the tongue of the harrow.

In order to mount the rearward implement, such as a soil packer P in the illustrated use of the invention, the trailer is merely backed until the portion of the frame rearward of the wheels is disposed over the implement. Since the end section of the trailer is well clear of the ground this operation is performed without interference.

As a result, the implements are mounted on a sturdy trailer with ease, in a balanced condition, and supported by wheels that are laterally braced, which brace does not interfere with the mounting and dismounting of the implements. Of course, implements other than agricultural devices may be transported by the trailer without departing from the essence of the invention.

Having completed a detailed description of a preferred embodiment of the invention it will be understood that various modifications thereof may be made within the scope of the invention as defined in the appended claims.

What is claimed is:

1. A trailer for transporting two heavy agricultural implements comprising a chassis having an elongated rigid framework, struts depending from said framework intermediate the ends thereof, an axle extending across the lower ends of said struts to brace the same, road wheels mounted on said axle whereby said framework is carried at a considerable height above the ground, windlass means mounted on said framework ahead of said wheels for supporting one implement, windlass means mounted behind said wheels for supporting another implement, and a tongue attached to said framework extending forwardly thereof, said framework forward of the wheels being devoid of members that extend any considerable distance toward the ground whereby the portion of said framework forward of said wheels can be positioned over an agricultural implement by a combined forward and lateral motion of said chassis, the rearward end of said framework being devoid of members that extend any considerable distance toward the ground whereby the rearward portion may be backed over another agricultural implement.

2. A trailer for transporting two heavy agricultural implements comprising a chassis having an elongated rigid framework, struts depending from said framework intermediate the ends thereof, an axle extending across the lower ends of said struts to brace the same, road wheels mounted on said axle whereby said framework is carried at a considerable height above the ground, windlass means mounted on said framework ahead of said wheels for supporting one implement, windlass means mounted behind said wheels for supporting another implement, and a tongue attached to said framework extending forwardly thereof, said framework forward of the wheels being devoid of members that extend any considerable distance toward the ground whereby the portion of said framework forward of said wheels can be positioned over an agricultural implement by a combined forward and lateral motion of said chassis, the rearward end of said framework being devoid of members that extend any considerable distance toward the ground whereby the rearward portion may be backed over another agricultural implement, said tongue extending gradually forwardly and downwardly from said framework to clear the tongue of the forwardly mounted implement.

3. A trailer for transporting two heavy agricultural implements comprising a chassis having an elongated rigid framework, struts depending from said framework intermediate the ends and behind the midsection thereof, an axle extending across the lower ends of said struts to brace the same, road wheels mounted on said axle whereby said framework is carried at a considerable height above the ground, windlass means mounted on said framework ahead of said wheels for supporting one implement, windlass means mounted behind said wheels for supporting another implement, and a tongue attached to said framework extending forwardly thereof, said framework forward of the wheels being devoid of members that extend any considerable distance toward the ground whereby the portion of said framework forward of said wheels can be positioned over an agricultural implement by a combined forward and lateral motion of said chassis, the rearward end of said framework being devoid of members that extend any considerable distance toward the ground whereby the rearward portion may be backed over another agricultural implement.

4. A trailer for transporting heavy agricultural implements comprising a chassis having an elongated rigid framework, struts depending from said framework intermediate the ends thereof, an axle extending across the lower ends of said struts to brace the same, road wheels mounted on said axle whereby said framework is carried at a considerable height above the ground, a pair of longitudinally spaced windlass assemblies mounted on said framework ahead of said wheels for supporting one implement and another pair mounted on said framework behind said wheels for supporting another implement, and a tongue attached to said framework extending forwardly thereof, said framework forward of the wheels being devoid of members that extend any considerable distance toward the ground whereby the portion of said framework forward of said wheels can be positioned over an agricultural implement by a combined forward and lateral motion of said chassis, the rearward end of said framework being devoid of members that extend any considerable distance toward the ground whereby the rearward portion may be backed over another agricultural implement.

5. A trailer for transporting heavy agricultural implements comprising a chassis having an elongated rigid framework, struts depending from said framework intermediate the ends thereof, an axle extending across the lower ends of said struts to brace the same, road wheels mounted on said axle whereby said framework is carried at a considerable height above the ground, a pair of longitudinally spaced windlass assemblies mounted on said framework ahead of said wheels for supporting one implement and another pair mounted on said framework behind said wheels for supporting another implement, each of said windlass assemblies comprising a shaft journalled adjacent each end to the framework, a ratchet and pawl assembly associated with each shaft, and cable means fixed to the shaft adjacent each end thereof, and a tongue attached to said framework extending forwardly thereof, said framework forward of the wheels being devoid of members that extend any considerable distance toward the ground whereby the portion of said framework forward of said wheels can be positioned over an agricultural implement by a combined forward and lateral motion of said chassis, the rearward end of said framework being devoid of members that extend any considerable distance toward the ground whereby the rearward portion may be backed over another agricultural implement.

6. A trailer for transporting two heavy agricultural implements comprising a chassis having an elongated rigid framework, struts depending from said framework intermediate the ends thereof, an axle extending across the lower ends of said struts to brace the same, road wheels mounted on said axle whereby said framework is carried at a considerable height above the ground, windlass means mounted on said framework ahead of said wheels for supporting one implement, windlass means mounted on said frame behind said wheels for supporting another implement, and a tongue attached to said framework extending forwardly therefrom, all of the members of said framework being substantially in a horizontal plane whereby the portion of said framework forward of said wheels can be positioned over an agricultural implement by a combined forward and lateral motion of said chassis, the rearward end of said framework being adapted for moving the rearward portion over another agricultural implement.

HAROLD W. YERIAN.

REFERENCES CITED

The following references are of record in the file of this patent:

UNITED STATES PATENTS

| Number | Name | Date |
|---|---|---|
| 2,164,550 | Steward | July 4, 1939 |
| 2,404,898 | Aycock | July 30, 1946 |
| 2,454,675 | Showalter | Nov. 23, 1948 |
| 2,472,557 | Wills | June 7, 1949 |
| 2,496,153 | Eaves, Jr., et al. | Jan. 31, 1950 |
| 2,500,700 | Niles | Mar. 14, 1950 |
| 2,517,160 | Alphin, Jr. | Aug. 1, 1950 |
| 2,546,472 | O'Connor | Mar. 27, 1951 |